US008547233B2

(12) United States Patent
Lee et al.

(10) Patent No.: US 8,547,233 B2
(45) Date of Patent: Oct. 1, 2013

(54) INTEGRATED CIRCUIT AND METHOD OF OPERATING THE SAME

(75) Inventors: Jui-Chung Lee, Yun-Lin (TW); Wen-Hung Tu, Taichung County (TW); Guo-Zhen Huang, Hsinchu County (TW)

(73) Assignee: Macronix International Co., Ltd., Hsinchu (TW)

( * ) Notice: Subject to any disclaimer, the term of this patent is extended or adjusted under 35 U.S.C. 154(b) by 367 days.

(21) Appl. No.: 12/916,691

(22) Filed: Nov. 1, 2010

(65) Prior Publication Data

US 2012/0051491 A1 Mar. 1, 2012

(30) Foreign Application Priority Data

Aug. 25, 2010 (TW) ................. 99128541 A

(51) Int. Cl.
*G08B 13/14* (2006.01)
(52) U.S. Cl.
USPC ....................... 340/572.1; 340/5.92; 340/10.1

(58) Field of Classification Search
USPC .............. 340/572.1–572.9, 5.92, 10.1, 10.52
See application file for complete search history.

(56) References Cited

U.S. PATENT DOCUMENTS

| | | | |
|---|---|---|---|
| 5,228,923 A * | 7/1993 | Hed | 136/208 |
| 7,069,100 B2 | 6/2006 | Monette et al. | |
| 7,348,887 B1 * | 3/2008 | Warner et al. | 340/572.3 |
| 7,359,198 B2 * | 4/2008 | Kelly et al. | 361/699 |
| 7,432,808 B2 | 10/2008 | Posamentier | |
| 2003/0230798 A1 * | 12/2003 | Lin et al. | 257/704 |
| 2005/0139250 A1 | 6/2005 | DeSteese et al. | |
| 2005/0212679 A1 * | 9/2005 | Norrena et al. | 340/588 |
| 2005/0268690 A1 * | 12/2005 | Weckstrom et al. | 73/23.2 |

* cited by examiner

*Primary Examiner* — Daniel Previl
(74) *Attorney, Agent, or Firm* — Volpe and Koenig, P.C.

(57) ABSTRACT

An integrated circuit includes a thermal-effect unit and a processing unit. The thermal-effect unit generates an electrical energy and forms a temporary channel when experiencing a thermal cycle. The processing unit has a thermal-cycle number, and updates the thermal-cycle number through the temporary channel in response to the electrical energy.

20 Claims, 4 Drawing Sheets

INTEGRATED CIRCUIT AND METHOD OF OPERATING THE SAME

FIELD OF THE INVENTION

The present invention relates to an integrated circuit and a method of operating the same, and more particularly to an integrated circuit for radio frequency identification and a method of operating the same.

BACKGROUND OF THE INVENTION

The integrated circuit package, such as the tray and so forth, can be reclaimed and reused in response to the trend of the environmental protection. However, because the integrated circuit carrier has a plastic material, the property of the plastic material will change after the carrier is heated, and the measuring or testing apparatus cannot detect the change of the property. Therefore, when the integrated circuit carrier is reused in the process in the state the carrier has been heated repeatedly, the quality of the carrier will have the risk of uncertainty.

A common radio frequency identification (RFID) unit is classified as a passive RFID unit or an active RFID unit. The passive RFID unit is provided with its required electrical energy by the electromagnetic induction with the reader. The active RFID unit must be supplied with its required power by externally applying a voltage source to the active RFID unit. The active RFID unit must be loaded with a voltage source for supplying the required power of the active RFID unit. The RFID unit is fixed to or embedded in the integrated circuit carrier. In order to reduce the volume of the active RFID unit and save the cost thereof, it is designed that the mechanism producing the electrical energy is disposed in the active RFID unit.

Please refer to FIG. 1, which is a schematic diagram showing a conventional RFID system 20. The RFID system 20 includes a reader 22 and a passive RFID unit 10. When the reader 22 is to read the passive RFID unit 10, the reader 22 transmits a radio frequency (RF) signal S11 to the passive RFID unit 10. The passive RFID unit 10 includes an antenna 11, a power controller 12, a modulation circuit 13, a memory unit 14, a logic unit 15 and a clock selector 16. The antenna 11 converts the RF signal S11 into an alternating-current (AC) signal S12 by the electromagnetic induction with the reader 22. The power controller 12 rectifies the AC signal S12 to provide direct-current (DC) supply voltages respectively to the memory unit 14 and the logic unit 15. The clock selector 16 is coupled to the antenna 11, and provides a master clock signal CLK1 to the logic unit 15. The logic unit 15 controls the memory unit 14 in response to the master clock signal CLK1, and sequentially reads data in the memory unit 14 to produce a coded message S13. The modulation circuit 13 provides a modulated signal S14 to the antenna 11 according to the coded message S13, so that the reader 22 obtains the data in the memory unit 14.

A technical scheme in the prior art disclosed in U.S. Pat. No. 7,069,100 B2 provides an automated manufacturing control system. A technical scheme in the prior art disclosed in U.S. Patent Application Publication No. US 2005/0139250 A1 provides thermoelectric devices and applications for the same. A technical scheme in the prior art disclosed in U.S. Pat. No. 7,348,887 B1 provides RFIDs embedded into semiconductors. A technical scheme in the prior art disclosed in U.S. Pat. No. 7,432,808 B2 provides a wireless module enabled component carrier for parts inventory and tracking.

SUMMARY OF THE INVENTION

The present invention has the first concept as follows. A RF integrated circuit is embedded in the integrated circuit carrier. The number of the thermal cycles that the integrated circuit carrier can bear is estimated beforehand, and the thermal-cycle limit number is prerecorded in the RF integrated circuit. If the thermal-cycle number that the integrated circuit carrier experiences goes beyond or approaches to the safety number and the reader/writer of the semiconductor supply-chain process has detected this condition, the reader/writer sends out a warning. Therefore, using the integrated circuit carrier should be stopped.

The present invention has the second concept as follows. The thermoelectric material and mechanism is embedded in the RF integrated circuit by the semiconductor process to form a thermoelectric RF integrated circuit. Afterwards, utilizing the property that the package/carrier of the thermoelectric RF integrated circuit should experience a thermal baking in the whole semiconductor supply chain, the thermoelectric RF integrated circuit, which can be heated when baked, converts the heat energy into the electrical energy. The electrical energy is stored in a capacitor in the thermoelectric RF integrated circuit, and the thermoelectric RF integrated circuit still retains the function of passive power generating.

By integrating the first and the second concepts, it is unnecessary that the thermoelectric RF integrated circuit occupies the excessive volume when embedded in the carrier thereof. In this manner, the thermoelectric RF integrated circuit can be more easily embedded in the carrier thereof.

It is therefore an aspect of the present invention to provide an integrated circuit. The integrated circuit includes a thermal-effect unit and a processing unit. The thermal-effect unit generates an electrical energy and forms a temporary channel when experiencing a thermal cycle. The processing unit has a thermal-cycle number, and updates the thermal-cycle number through the temporary channel in response to the electrical energy.

It is therefore another aspect of the present invention to provide a method of operating an integrated circuit. The method includes the following steps. A thermal-cycle number is provided. An electrical energy is generated and a temporary channel is formed when experiencing a thermal cycle. Furthermore, the thermal-cycle number is updated through the temporary channel in response to the electrical energy.

It is therefore still another aspect of the present invention to provide an integrated circuit. The integrated circuit includes a circuit unit. The circuit unit has a thermal-cycle number, and generates an electrical energy and temporarily conducts the electrical energy for updating the thermal-cycle number when experiencing a thermal cycle.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2:
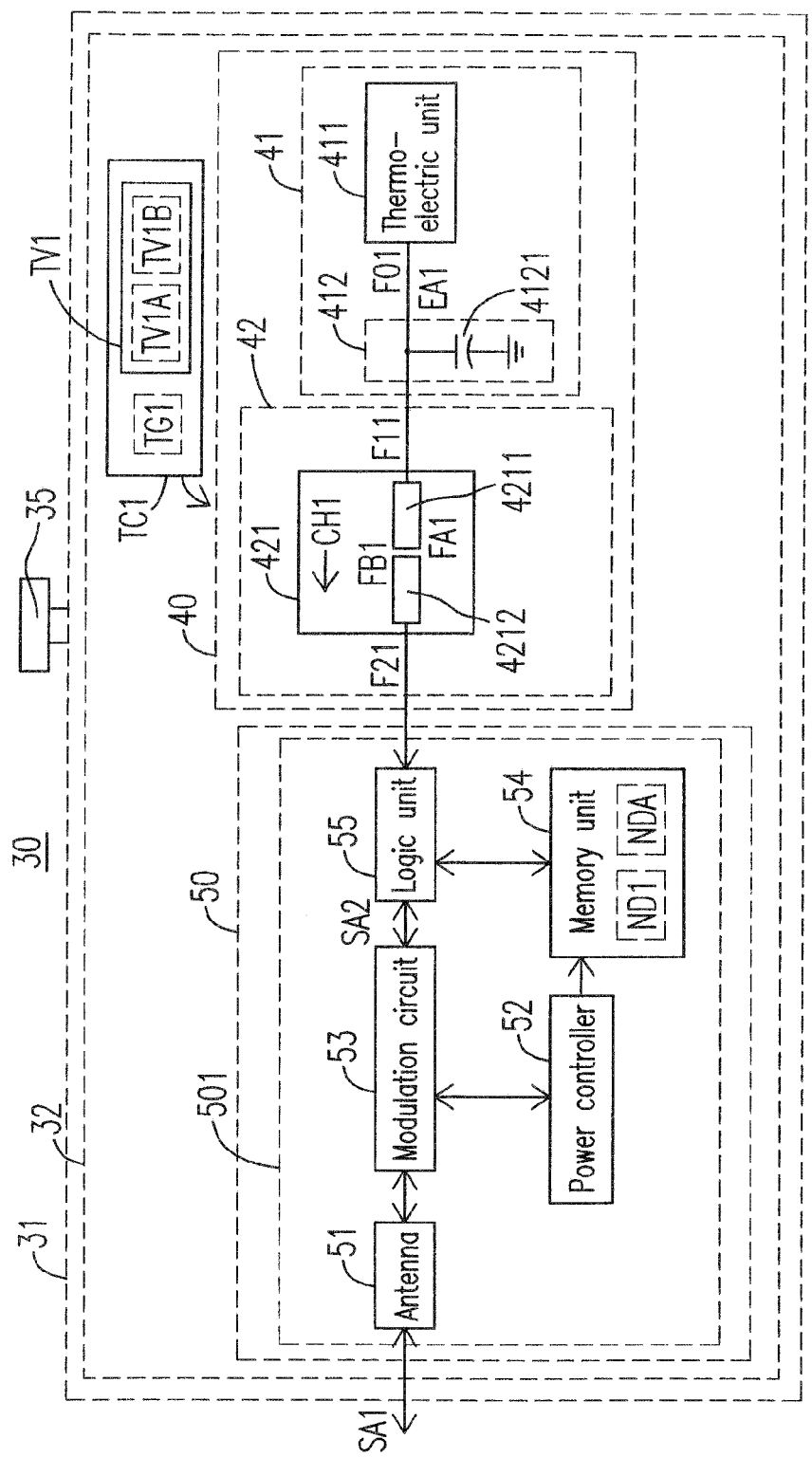
FIG. 2 is a schematic diagram showing an integrated circuit system according to the first embodiment of the present invention.

Please refer to FIG. 2, which is a schematic diagram showing an integrated circuit system 30 according to the first embodiment of the present invention. As shown, the integrated circuit system 30 includes an integrated circuit 31 and an integrated circuit carrier 35. For example, the integrated circuit 31 is fixed to or embedded in the integrated circuit carrier 35, and the integrated circuit carrier 35 may be a plastic carrier. In an embodiment, the integrated circuit 31 includes a circuit unit 32. The circuit unit 32 has a thermal-cycle number ND1, and generates an electrical energy EA1 and temporarily conducting the electrical energy EA1 for updating the thermal-cycle number ND1 when experiencing a thermal cycle TC1.

In an embodiment, the circuit unit 32 includes a thermal-effect unit 40 and a processing unit 50. The processing unit 50 is coupled to the thermal-effect unit 40. The thermal-effect unit 40 generates the electrical energy EA1 and forms a temporary channel CH1 when experiencing the thermal cycle TC1. The processing unit 50 has the thermal-cycle number ND1, and updates the thermal-cycle number ND1 through the temporary channel CH1 in response to the electrical energy EA1.

In an embodiment, the thermal cycle TC1 has a temperature gradient TG1, a variable temperature TV1, a first time point and a second time point, and the variable temperature TV1 becomes a threshold temperature TV1A and a threshold temperature TV1B respectively at the first and the second time points. For example, the temperature gradient TG1 has a temperature distribution between the variable temperature TV1 and an environmental temperature of the integrated circuit 31. The thermal-effect unit 40 includes an electrical-energy mechanism 41 and a thermal detection unit 42. The electrical-energy mechanism 41 generates the electrical energy EA1 in response to the temperature gradient TG1, and the electrical-energy mechanism 41 may store the electrical energy EA1.

When the variable temperature TV1 is higher than the threshold temperature TV1A, the thermal detection unit 42 forms the temporary channel CH1 to transmit the electrical energy EA1 to the processing unit 50. The electrical-energy mechanism 41 includes a thermoelectric unit 411 and an energy-storage unit 412. The thermoelectric unit 411 generates the electrical energy EA1 in response to the temperature gradient TG1. The energy-storage unit 412 is used to temporarily store the electrical energy EA1. For example, the energy-storage unit 412 is coupled between the electrical-energy mechanism 41 and the thermal detection unit 42.

In an embodiment, the thermal detection unit 42 includes a thermal switch 421. The thermal switch 421 is coupled between the electrical-energy mechanism 41 and the processing unit 50. When the variable temperature TV1 is higher than the threshold temperature TV1A, the thermal switch 421 forms the temporary channel CH1 and is turned on. The energy-storage unit 412 includes a capacitor 4121. For example, a first terminal of the capacitor 4121 is coupled to an output terminal F01 of the thermoelectric unit 411 and a first terminal F11 of the thermal switch 421; a second terminal F21 of the thermal switch 421 is coupled to the processing unit 50. The thermal switch 421 includes two thermal detection conduction structures 4211 and 4212. The thermal detection conduction structures 4211 and 4212 touch each other to turn on the thermal switch 421 when the variable temperature TV1 is higher than the threshold temperature TV1A, and the thermal detection conduction structures 4211 and 4212 are electrically isolated from each other to turn off the thermal switch 421 when the variable temperature TV1 is lower than the threshold temperature TV1B. For example, the threshold temperature TV1B is lower than the threshold temperature TV1A, and each of the thermal detection conduction structures 4211 and 4212 has a metal material.

In an embodiment, the thermal detection conduction structure 4211 has a first terminal FA1 and a second terminal F11, and the thermal detection conduction structure 4212 has a first terminal FB1 and a second terminal F21. When the variable temperature TV1 is higher than the threshold temperature TV1A, the first terminal FA1 of the thermal detection conduction structure 4211 and the first terminal FB1 of the thermal detection conduction structures 4212 touch each other to turn on the thermal switch 421.

Figure 1:
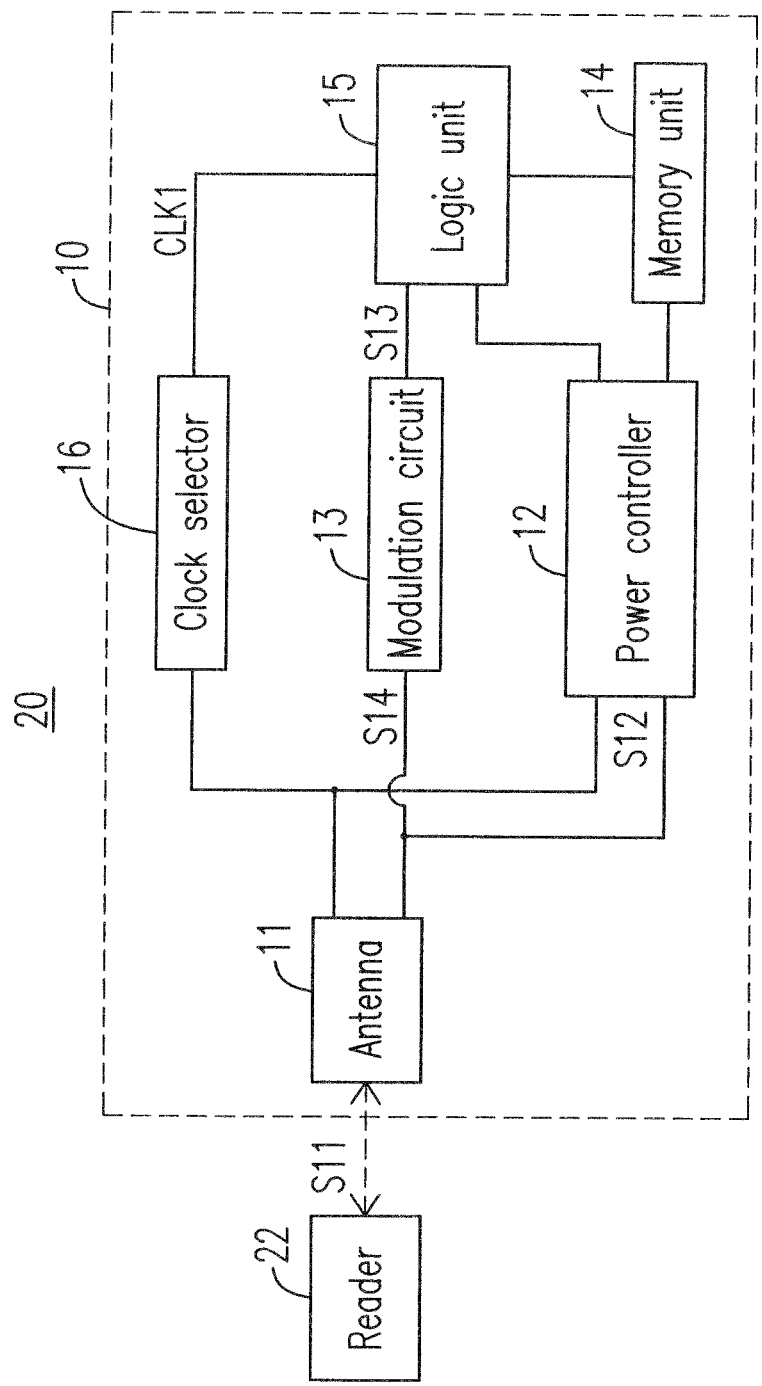
FIG. 1 is a schematic diagram showing a conventional RFID system.

In an embodiment, the processing unit 50 includes a passive RFID unit 501, and the passive RFID unit 501 includes an antenna 51, a power controller 52, a modulation circuit 53, a memory unit 54 and a logic unit 55. Functions of the antenna 51, the power controller 52, the modulation circuit 53, the memory unit 54 and the logic unit 55 in FIG. 2 are respectively similar to those of the antenna 11, the power controller 12, the modulation circuit 13, the memory unit 14 and the logic unit 15 in FIG. 1. The technical features of the passive RFID unit 501 are further described as follows.

The modulation circuit 53 is coupled to the antenna 51. The power controller 52 is coupled to the modulation circuit 53. The memory unit 54 is coupled to the power controller 53, and stores the thermal-cycle number ND1 and a thermal-cycle limit number NDA. The logic unit 55 is coupled to the modulation circuit 53, the memory unit 54 and the thermal detection unit 42, and responds to the electrical energy EA1 through the temporary channel CH1 to update the thermal-cycle number ND1 by adding 1. In an embodiment, when the thermal-cycle number ND1 reaches the thermal-cycle limit number NDA, the processing unit 50 sends out a signal SA1, wherein the signal SA1 may be a RF signal. For example, when the logic unit 55 of the processing unit 50 finds that the thermal-cycle number ND1 reaches the thermal-cycle limit number NDA, the logic unit 55 sends out a signal SA2 to cause the antenna 51 to send out the signal SA1 to a reader/writer (not shown). In an embodiment, the reader/writer sends out a warning when a condition happens and the reader/writer detects the condition, wherein the condition is that the thermal-cycle number ND1 reaches the thermal-cycle limit number NDA.

In an embodiment, under the condition that the integrated circuit 31 has not experienced any thermal cycle, the thermal-cycle number ND1 is preset to 0. Afterwards, whenever the integrated circuit 31 experiences one thermal cycle, the thermal-cycle number ND1 is increased by 1. Therefore, the thermal-cycle number ND1 which the integrated circuit 31 or the integrated circuit carrier 35 experiences can be obtained by using the reader/writer to read the memory unit 54. In an embodiment, the data stored in the memory unit 54 cannot be deleted, but can be modified.

In an embodiment provided according to FIG. 2, a method of operating an integrated circuit 31 includes the following steps. A thermal-cycle number ND1 is provided. An electrical energy EA1 is generated and a temporary channel CH1 is formed when experiencing a thermal cycle TC1. Furthermore, the thermal-cycle number ND1 is updated through the temporary channel CH1 in response to the electrical energy EA1.

In an embodiment, a method of operating the integrated circuit system 30 includes the following steps.

(1) When the integrated circuit system 30 is in a process having a temperature difference and the temperature difference is generated initially, the thermoelectric unit 411 in the integrated circuit system 30 begins acting, converts the heat energy associated with the temperature difference to the electrical energy EA1, and stores the electrical energy EA1 in the capacitor 4121.

(2) When the temperature difference of the process reaches or exceeds the designed temperature difference and the temperature of the process in relation to the environmental temperature of the integrated circuit system 30 is higher than the considered specific temperature, the thermal detection unit 42 in the integrated circuit system 30 is heated to expand, and causes the thermal detection conduction structures 4211 and 4212 to touch each other for forming an electronic channel, wherein each of the thermal detection conduction structures 4211 and 4212 has a metal material.

(3) In the mean time, the electrical energy EA1 stored in the capacitor 4121 passes through the electronic channel, wherein the electronic channel is formed after the thermal detection unit 42 is heated.

(4) In the state that the thermal detection unit 42 forms the electronic channel, the logic unit 55 receives the electrical energy EA1 through the electronic channel, and make a response to store a counted message into the memory unit 54 in response to the electrical energy EA1; for example, updating the thermal-cycle number ND1 previously stored in the memory unit 54. In an embodiment, the data stored in the memory unit 54 cannot be deleted, but can be modified.

(5) After the heating process is finished, the integrated circuit system 30 is moved out and the temperature of the integrated circuit system 30 begins lowering. The thermal detection conduction structures 4211 and 4212 begin shrinking due to cooling until that the electronic channel becomes open, so that the electronic signal of the thermoelectric unit 411 cannot pass through the thermal detection unit 42. When the temperature of the integrated circuit system 30 is reduced to the environmental temperature, a high-temperature process is completed.

(6) Wait for the next time. Then, the integrated circuit system 30 experiences another high-temperature process once again, and another whole operation way of the method follows the step (1) to the step (5).

Figure 3A:
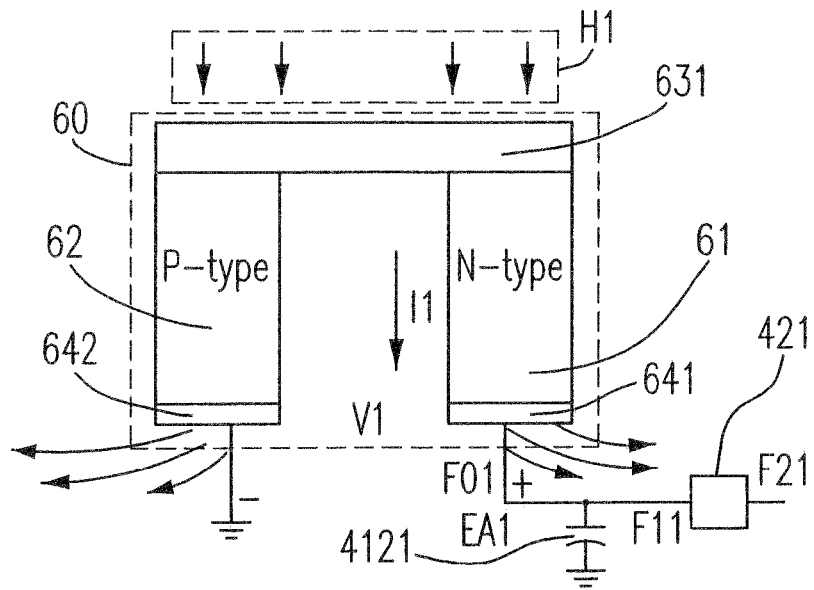
FIG. 3(a) is a schematic diagram showing a configuration associated with an implementation structure of a thermoelectric unit according to the first embodiment of the present invention.
Figure 3B:
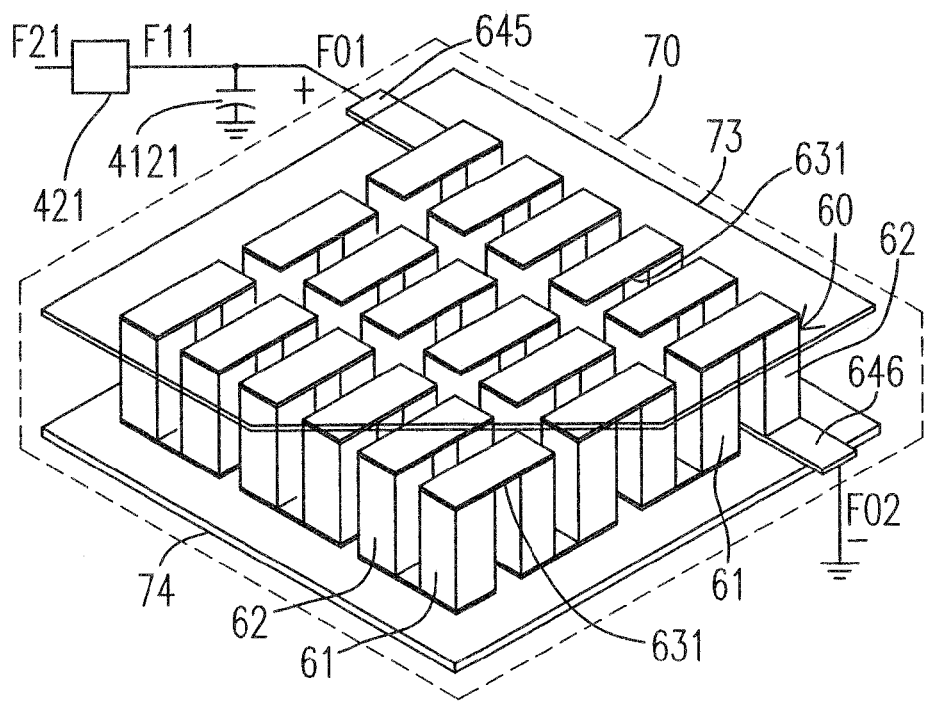
FIG. 3(b) is a schematic diagram showing a configuration associated with another implementation structure of the thermoelectric unit according to the first embodiment of the present invention.

Please refer to FIG. 3(*a*), which is a schematic diagram showing a configuration associated with an implementation structure 60 of the thermoelectric unit 411 according to the first embodiment of the present invention. FIG. 3(*a*) shows the capacitor 4121, the thermal switch 421 and the implementation structure 60 of the thermoelectric unit 411. The implementation structure 60 of the thermoelectric unit 411 includes an N-type thermoelectric material layer 61, a P-type thermoelectric material layer 62, and three electric conduction layers 631, 641 and 642. The electric conduction layer 631 connects the N-type thermoelectric material layer 61 and the P-type thermoelectric material layer 62. The electric conduction layers 641 and 642 are formed on the N-type thermoelectric material layer 61 and the P-type thermoelectric material layer 62 respectively. For example, the electric conduction layers 641 is coupled to the first terminal of the capacitor 4121 and the first terminal F11 of the thermal switch 421. The electric conduction layer 631 receives a heat energy H1 to cause the electric conduction layer 631 to be a hot node and to cause the electric conduction layers 641 and 642 to be cold nodes. The heat energy H1 causes the implementation structure 60 to form a temperature gradient and to generate a voltage V1 between the electric conduction layers 641 and 642. When the electrical energy EA1 is being generated, there is the current I1 to flow.

As shown in FIG. 3(*a*), the core component of the implementation structure 60 of the thermoelectric unit 411 is a thermocouple. The thermocouple includes two semiconductor materials having different conductivity types, wherein the two semiconductor materials are connected by a metal plate, and the P-type and the N-type are used to represent the different conductivity mechanisms of the two semiconductor materials. The thermoelectric generating phenomenon can be generated, when a complete conduction loop is formed between the electric conduction layers 641 and 642 (for example, the capacitor has not been fully charged yet) and the thermocouple is positioned in the environment having a temperature gradient (that is, the top is hotter than the bottom). Under this condition, the implementation structure 60 can produce a current and converts the heat energy H1 into the electrical energy, which is called the Seebeck effect. In FIG. 3(*a*), a film thermoelectric material may be grown by employing the conventional semiconductor deposit methods, and may be processed by employing the conventional semiconductor microfabrication techniques.

Please refer to FIG. 3(*b*), which is a schematic diagram showing a configuration associated with an implementation structure 70 of the thermoelectric unit 411 according to the first embodiment of the present invention. FIG. 3(*b*) shows the capacitor 4121, the thermal switch 421 and the implementation structure 70 of the thermoelectric unit 411. The implementation structure 70 of the thermoelectric unit 411 includes a plurality of implementation structures 60, and two insulation substrates 73 and 74. The plurality of implementation structures 60 are connected in series. The insulation substrate 73 is formed on a plurality of electric conduction layers 631, and the insulation substrate 74 is formed on a plurality of electric conduction layers 645, . . . , and 646. For example, the insulation substrates 73 and 74 are ceramic insulation substrates. The first terminal F01 of the implementation structure 70 is a terminal of the electric conduction layer 645, and a second terminal F02 of the implementation structure 70 is a terminal of the electric conduction layer 646. The electric conduction layer 645 is coupled to the first terminal of the capacitor 4121 and the first terminal F11 of the thermal switch 421.

As shown in FIG. 3(*b*), the implementation structure 70 of the thermoelectric unit 411 includes a plurality of P-type thermoelectric material layers, a plurality of N-type thermoelectric material layers, a plurality of electric conduction layers, and insulation substrates 73 and 74, wherein the thermoelectric figure of merit (ZT) of the thermoelectric material layer mainly determines the thermoelectric conversion efficiency of the thermoelectric unit 411. The thermoelectric figure of merit (ZT) is defined as $ZT=S^2\sigma T/(\kappa_e+\kappa_L)$, wherein S is the Seebeck coefficient, $\sigma$ is the electrical conductivity, T is the absolute temperature, $\kappa_e$ is the electronic thermal conductivity, and $\kappa_L$ is the lattice-phonon thermal conductivity.

Figure 4A:
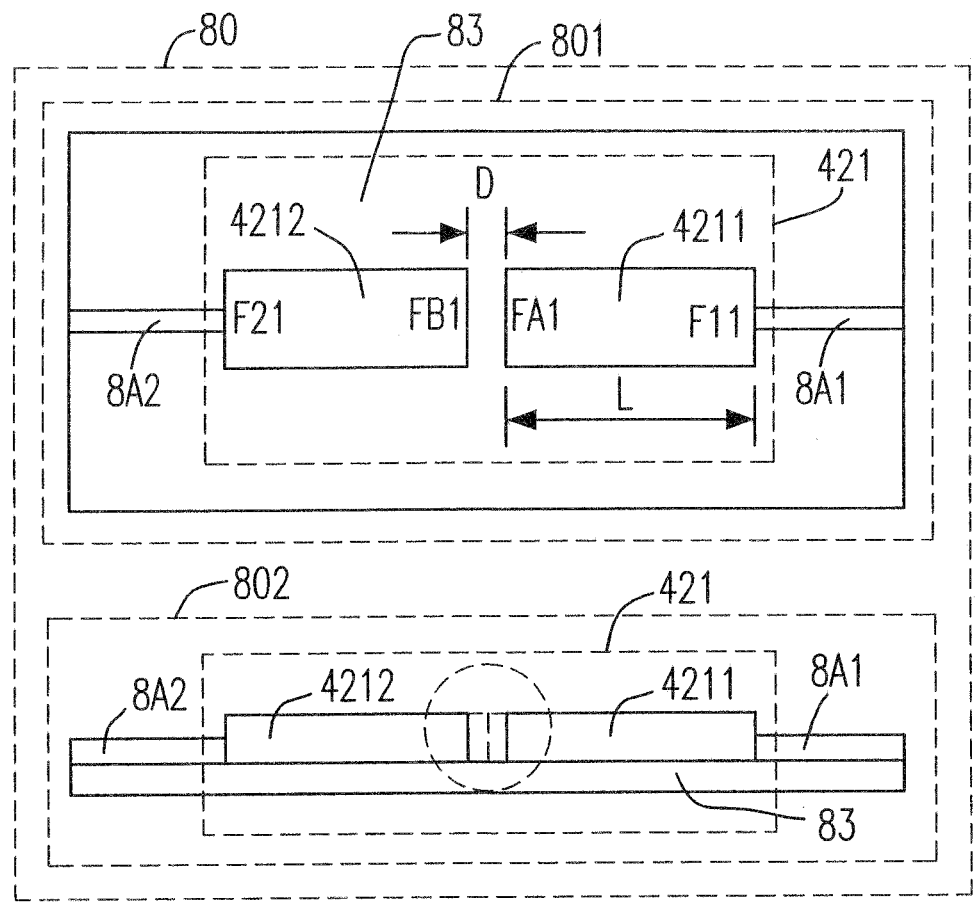
FIG. 4(a) is a schematic diagram showing an implementation structure of a thermal detection unit according to the first embodiment of the present invention.
Figure 4B:
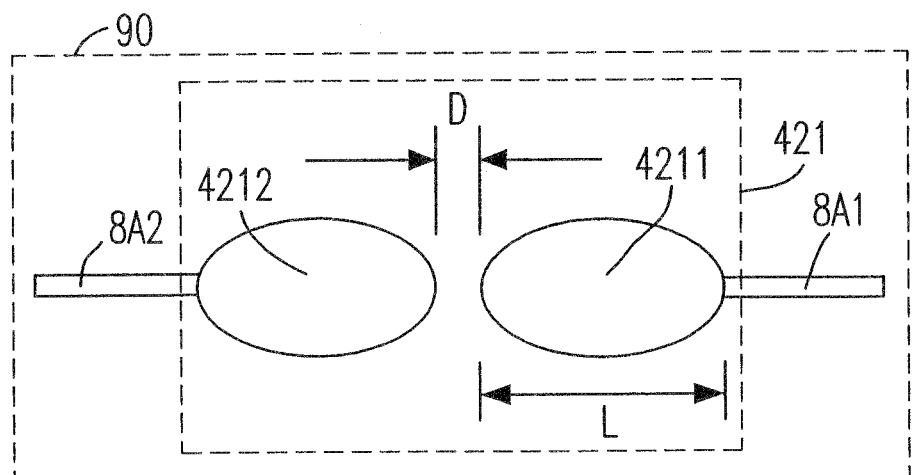
FIG. 4(b) is a schematic diagram showing another implementation structure of the thermal detection unit according to the first embodiment of the present invention.

Please refer to FIG. 4(*a*), which is a schematic diagram showing an implementation structure 80 of the thermal detection unit 42 according to the first embodiment of the present invention. As shown, the implementation structure 80 is presented by a top view 801 and a front view 802. The implementation structure 80 of the thermal detection unit 42 includes the thermal switch 421, and two wires 8A1 and 8A2. The thermal switch 421 includes a substrate 83 and the thermal detection conduction structures 4211 and 4212. The thermal detection conduction structures 4211 and 4212 are disposed on the substrate 83. The thermal detection conduction structure 4211 has the first terminal FA1 and the second terminal F11, and the thermal detection conduction structure 4212 has the first terminal FB1 and the second terminal F21. For example, each of the thermal detection conduction structures 4211 and 4212 has a length L and a metal material expanded when heated. In the environmental temperature, there is a distance D between the first terminal FA1 of the thermal detection conduction structure 4211 and the first terminal FB1 of the thermal detection conduction structure 4212.

Under the condition that the variable temperature TV1 is higher than the threshold temperature TV1A, if it is desired that the first terminal FA1 of the thermal detection conduction structures 4211 and the first terminal FB1 of the thermal detection conduction structure 4212 touch each other to turn on the thermal switch 421, the distance D should satisfy the following expression: $D<2\cdot L\cdot t_d\cdot\alpha$, wherein $t_d$ is the temperature difference between the threshold temperature TV1A and the environmental temperature, and $\alpha$ is the thermal expansion coefficient of the thermal detection conduction structures 4211 and 4212. In an embodiment, the distance D between the thermal detection conduction structures 4211 and 4212 may be determined through the precise calculation according to the thermal expansion coefficients of the metal materials, the application environmental temperature of the present invention, and the lengths of the thermal detection conduction structures 4211 and 4212. In FIG. 4(*a*), the wire 8A1 is used to connect the second terminal F11 of the thermal detection conduction structure 4211 and the electrical-energy mechanism 41, and the wire 8A2 is used to connect the second terminal F21 of the thermal detection conduction structure 4212 and the processing unit 50.

Please refer to FIG. 4(*b*), which is a schematic diagram showing an implementation structure 90 of the thermal detection unit 42 according to the first embodiment of the present invention. As shown, the implementation structure 90 of the thermal detection unit 42 is similar to the implementation structure 80 of the thermal detection unit 42. The differences between the two implementation structures 90 and 80 are described as follows. In view of the top view 801 in FIG. 4(*a*), the contours of the thermal detection conduction structures 4211 and 4212 are rectangular. In FIG. 4(*b*), the contours of the thermal detection conduction structures 4211 and 4212 are elliptical, the desired touch position of one ellipse and that of another ellipse are at the vertices of the two ellipses respectively, which face each other.

The features of the present invention include as follows.

The integrated circuit system 30 may be applied to the situation: it is necessary that the integrated circuit system 30 experiences the high-temperature processes in itself, and it is understood that the number the integrated circuit system 30 can experience the high-temperature processes. The integrated circuit system 30 may be applied to the situation that the integrated circuit 31 may generate its required electrical energy of itself through the temperature difference therein. The data stored in the integrated circuit 31 may include data associated with the product, which uses the integrated circuit 31. For example, the stored data may include that: (1) the manufacturing date and the supplier of the integrated circuit carrier 35; (2) the manufacturing data of the package of the integrated circuit 31, such as the lot number and the manufacturing time; and (3) other data.

Using the current semiconductor processes, the electrical-energy mechanism 41 may be integrated on the silicon substrate in the integrated circuit 31. The thermoelectric material can be made by the semiconductor processes, and also may be made of the nanostructure, wherein the thermoelectric material is not confined to some kind of thermoelectric material, and there are many materials capable to be used in the current processes. Referring to the embodiments shown in FIG. 4(*a*) and FIG. 4(*b*), the materials and the types of the thermal detection conduction structures 4211 and 4212 are not confined to any form as long as the materials can conduct electricity, such as the metals capable to expand when heated. Because the electrical-energy mechanism 41 is embedded in the integrated circuit 31, the integrated circuit 31 may become an active RF integrated circuit due to that it is unnecessary to load an external voltage source to the integrated circuit 31. Because the thermal detection unit 42 is embedded in the integrated circuit 31, the integrated circuit 31 may become a counting RF integrated circuit and the counting RF integrated circuit may be applied to detecting the thermal cycles.

The technique, embedding the thermoelectric materials and the thermal detection unit in the integrated circuit by the semiconductor processes, may be applied to detecting how many times of re-flow or de-mount the integrated circuit package experiences in the surface-mount-technology (SMT) process, and this function may be used to judge whether the application of the SMT is suitable. The technique, embedding the thermoelectric materials in the integrated circuit by the semiconductor processes, may utilize the reverse reactions of the thermoelectric materials to cool the integrated circuit. The technique, embedding the thermoelectric materials in the integrated circuit by the semiconductor processes, may utilize the thermoelectric materials to convert the waste heat into the electrical energy in order to be used in the power consumption of some functions of the integrated circuit, and thus the supply demand of the external power can be saved to achieve the purpose of energy saving. The integrated circuit and its application of the present invention may be further configured to the structures or methods on how to apply the integrated circuit to various targets.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An integrated circuit, comprising:
   a thermal-effect unit generating an electrical energy and forming a temporary channel when experiencing a thermal cycle; and a processing unit having a thermal-cycle number, and updating the thermal-cycle number through the temporary channel in response to the electrical energy, wherein the thermal cycle has a temperature gradient, a variable temperature, a first time point and a second time point, and the variable temperature becomes a first threshold temperature and a second threshold temperature respectively at the first and the second time points.

2. An integrated circuit according to claim 1, fixed to a plastic carrier.

3. An integrated circuit according to claim 2, wherein the thermal-effect unit comprises:
   an electrical-energy mechanism generating the electrical energy in response to the temperature gradient, and storing the electrical energy; and
   a thermal detection unit forming the temporary channel to transmit the electrical energy to the processing unit when the variable temperature is higher than the first threshold temperature.

4. An integrated circuit according to claim 3, wherein the electrical-energy mechanism comprises:
   a thermoelectric unit generating the electrical energy in response to the temperature gradient; and
   an energy-storage unit temporarily storing the electrical energy.

5. An integrated circuit according to claim 4, wherein the energy-storage unit comprises a capacitor coupled to the thermoelectric unit.

6. An integrated circuit according to claim 3, wherein the thermal detection unit comprises:
   a thermal switch coupled between the electrical-energy mechanism and the processing unit, and forming the temporary channel and turned on when the variable temperature is higher than the first threshold temperature.

7. An integrated circuit according to claim 6, wherein the thermal switch comprises:
   two thermal detection conduction structures touching each other to turn on the thermal switch when the variable temperature is higher than the first threshold temperature, and electrically isolated from each other to turn off the thermal switch when the variable temperature is lower than the second threshold temperature, wherein the second threshold temperature is lower than the first threshold temperature.

8. An integrated circuit according to claim 1, wherein the processing unit comprises a passive radio frequency identification unit.

9. An integrated circuit according to claim 8, wherein the passive radio frequency identification unit comprises:
   an antenna;
   a modulation circuit coupled to the antenna;
   a power controller coupled to the modulation circuit;
   a memory unit coupled to the power controller, storing the thermal-cycle number and a thermal-cycle limit number; and
   a logic unit coupled to the modulation circuit, the memory unit and the thermal detection unit, responding to the electrical energy through the temporary channel to update the thermal-cycle number by adding 1, and sending out a signal when the thermal-cycle number reaches the thermal-cycle limit number.

10. A method of operating an integrated circuit, comprising steps of:
    providing a thermal-cycle number;
    generating an electrical energy and forming a temporary channel when experiencing a thermal cycle; and
    updating the thermal-cycle number through the temporary channel in response to the electrical energy, wherein the thermal cycle has a temperature gradient, a variable temperature, a first time point and a second time point, and the variable temperature becomes a first threshold temperature and a second threshold temperature respectively at the first and the second time points.

11. A method according to claim 10, further comprising steps of:
    generating the electrical energy by an thermoelectric effect in response to the temperature gradient;
    storing the electrical energy;
    forming the temporary channel and transmitting the electrical energy through the temporary channel when the variable temperature is higher than the first threshold temperature; and
    turning off the temporary channel when the variable temperature is lower than the second threshold temperature, wherein the second threshold temperature is lower than the first threshold temperature.

12. A method according to claim 10, wherein the thermal-cycle number is updated by adding 1, and the method further comprises steps of:
    providing a thermal-cycle limit number; and
    sending out a signal when the thermal-cycle number reaches the thermal-cycle limit number.

13. An integrated circuit, comprising:
    a circuit unit having a thermal-cycle number, and generating an electrical energy and temporarily conducting the electrical energy for updating the thermal-cycle number when experiencing a thermal cycle, wherein the thermal cycle has a temperature gradient, a variable temperature, a first time point and a second time point, and the variable temperature becomes a first threshold temperature and a second threshold temperature respectively at the first and the second time points.

14. An integrated circuit according to claim 13, wherein the circuit unit comprises:
    a thermal-effect unit generating the electrical energy and forming a temporary channel when experiencing the thermal cycle; and
    a processing unit having the thermal-cycle number, and updating the thermal-cycle number through the temporary channel in response to the electrical energy.

15. An integrated circuit according to claim 14, fixed to a plastic carrier.

16. An integrated circuit according to claim 15, wherein the thermal-effect unit comprises:
    an electrical-energy mechanism generating the electrical energy in response to the temperature gradient, and storing the electrical energy; and
    a thermal detection unit forming the temporary channel to transmit the electrical energy to the processing unit when the variable temperature is higher than the first threshold temperature.

17. An integrated circuit according to claim 16, wherein the electrical-energy mechanism comprises:
    a thermoelectric unit generating the electrical energy in response to the temperature gradient; and
    an energy-storage unit temporarily storing the electrical energy.

18. An integrated circuit according to claim 17, wherein the energy-storage unit comprises a capacitor coupled to the thermoelectric unit.

19. An integrated circuit according to claim 16, wherein the thermal detection unit comprises:

a thermal switch coupled between the electrical-energy mechanism and the processing unit, and forming the temporary channel and turned on when the variable temperature is higher than the first threshold temperature.

20. An integrated circuit according to claim 19, wherein the thermal switch comprises:

two thermal detection conduction structures touching each other to turn on the thermal switch when the variable temperature is higher than the first threshold temperature, and electrically isolated from each other to turn off the thermal switch when the variable temperature is lower than the second threshold temperature, wherein the second threshold temperature is lower than the first threshold temperature.

* * * * *